US005598497A

United States Patent [19]
Roller

[11] Patent Number: 5,598,497
[45] Date of Patent: Jan. 28, 1997

[54] APPARATUS FOR MOUNTING A LIGHT SOURCE WITHIN A SYSTEM FOR COUPLING LIGHT INTO AN OPTIC FIBER OR FIBER BUNDLE

[75] Inventor: Thomas W. Roller, Moorpark, Calif.

[73] Assignee: Cogent Light Technologies, Inc., Santa Clarita, Calif.

[21] Appl. No.: 502,563

[22] Filed: Jul. 14, 1995

[51] Int. Cl.$^6$ .................................................. G02B 6/36
[52] U.S. Cl. ............................. 385/92; 385/49; 385/52; 385/88
[58] Field of Search ................................. 385/53, 54, 52, 385/49, 88, 92, 93, 94

[56] References Cited

U.S. PATENT DOCUMENTS

| | | | |
|---|---|---|---|
| 4,533,209 | 8/1985 | Segerson et al. | 385/93 X |
| 4,757,431 | 7/1988 | Cross et al. | 362/261 |
| 4,778,240 | 10/1988 | Komatsu | 385/92 X |
| 5,104,243 | 4/1992 | Harding | 385/84 |
| 5,259,053 | 11/1993 | Schaffer et al. | 385/88 |
| 5,392,371 | 2/1995 | Morlion et al. | 385/52 |
| 5,430,630 | 7/1995 | Swarens et al. | 362/282 |
| 5,475,783 | 12/1995 | Kurashima | 385/92 |

*Primary Examiner*—Brian Healy
*Attorney, Agent, or Firm*—Rothwell, Figg, Ernst & Kurz

[57] ABSTRACT

A removable light source is provided for use with the optical coupling system. The light source is mounted to a removable assembly for slidable insertion into, and removed from, a housing containing the optical coupling system. The removable assembly includes positioning elements for maintaining precise alignment of the light source with optical components mounted within the housing. In one embodiment described herein, precise alignment is achieved by employing six mounting pads on outside surfaces of a base of the removable assembly. Three of the mounting pads are aligned along a first plane. Two are aligned along a second plane perpendicular to the first. The remaining pad is aligned along a third plane perpendicular to both the first and second planes. The light source is mounted to the base in a precise fixed relationship with the mounting pads. The removable assembly is inserted within a slot formed in the housing of the optical coupling system. Upon insertion, the mounting pads lie against mutually perpendicular interior walls of a receiving block of the housing. The mounting pads thereby ensure that the light source is precisely positioned with respect to the receiving block. Optical components within the housing are mounted in a precise fixed relationship with the receiving block. Accordingly, while inserted, the light source is maintained in precise alignment with the receiving block and thereby also in precise alignment with the optical components.

10 Claims, 3 Drawing Sheets

APPARATUS FOR MOUNTING A LIGHT SOURCE WITHIN A SYSTEM FOR COUPLING LIGHT INTO AN OPTIC FIBER OR FIBER BUNDLE

BACKGROUND OF THE INVENTION

1. Field of the Invention

The invention generally relates to optical systems for coupling light into a single optic fiber or fiber bundle.

2. Description of Related Art

A variety of optical coupling systems have been developed for coupling light from a high intensity light source such as an arc lamp into an optical fiber bundle or a single optic fiber. The light coupled into the bundle or single fiber may be used, for example, for medical illumination purposes such as for use with a surgical luminaire, head lamp, endoscope or borescope. For medical applications, in particular, it is necessary to couple as much light into the bundle or single fiber as possible to provide for adequate illumination of a surgical field when using a surgical luminaire, head lamp, etc. Accordingly, precise alignment of the light source with optical components of the coupler is required to ensure that a sufficient amount of light is coupled into the fiber or bundle. Such is particularly critical for coupling light into a single optic fiber which has a much smaller overall entry aperture than a fiber bundle. To ensure precise alignment, the optical source is typically rigidly mounted to an integrated assembly which also includes all or most of the internal optical components of the coupling system. For example, the source may be mounted to an integrated assembly which also includes one or more primary and secondary mirrors aligned for reflecting light from the source into the single fiber or fiber bundle. An integrated assembly is employed to prevent any displacement between the source and the optical components which may prevent an adequate amount of light to be coupled into the single fiber or fiber bundle. Such displacements may occur as a result of the optical coupler being bumped or jarred, perhaps by medical personnel, or may result from uneven heating of separate mounting components holding the source and optical components.

Although the use of an integrated assembly helps ensure adequate alignment of the source and optical components, the source itself cannot be easily and inexpensively replaced. Replacement is required if the source fails entirely. Replacement is also typically performed after the source has been operated for a predetermined number of hours. If integrated, the source and optical components must both be replaced. This is typically achieved by the user removing the integrated assembly and shipping the assembly back to the vendor who installs and aligns a new source. The light source itself cannot simply be replaced by the user because precise alignment of the source would not be ensured. Failure to properly align the source may result in physical damage to the interior of the optical coupler, particularly if light is focused to a position slightly offset from the entrance aperture of the single fiber or fiber bundle thereby resulting in overheating. Such overheating may ruin the fiber and perhaps the entire optical coupling system as well.

Costs associated with replacing the entire integrated assembly can be significant. Moreover, in circumstances where the source burns out, the user may be unable to use the optical system for a day or two before a replacement assembly can be provided.

Accordingly, it would be desirable to provide an improved optical coupler system which allows the optical source to be replaced without also requiring replacement of the optical components yet still ensuring precise alignment of the source with the optical components. It is to these ends that the present invention is drawn.

SUMMARY OF THE INVENTION

A removable light source is provided for use with an optical coupling system for coupling light from the source through an optical system into an output fiber element such as a single fiber optic or fiber bundle. The source, which may be an arc lamp, is mounted to a removable assembly configured for a slidable insertion into, and removal from, a housing containing the optical system. The removable assembly includes positioning elements for maintaining precise alignment of the source with the optical system while the assembly is positioned within the housing.

In one embodiment, precise alignment is achieved by providing six mounting pads on outside surfaces of a base of the removable assembly. Three of the mounting pads are aligned along a first plane. Two are aligned along a second plane perpendicular to the first. The remaining pad is aligned along a third plane perpendicular to both the first and second planes. The source is mounted to the base in a precise fixed relationship with the mounting pads.

In use, the removable assembly is inserted into a slot formed within the housing. The slot is formed within a base portion of the housing upon which the optical components are mounted. The slot has interior sidewalls having a precise fixed relationship with the optical components. Once the assembly is inserted into the slot, the mounting pads of the assembly press against top and side walls of the slot. The slot is formed within a base upon which the optical components are integrally mounted. The mounting pads, upon insertion, ensure precise alignment of the source with the slot, and thereby ensure precise alignment of the source with the optical components. Biasing means may be employed for holding the mounting pads against the interior side walls of the slot. In one embodiment, three spring-biasing elements are positioned to provide biasing force perpendicular to each of the three planes.

Hence, the six mounting pads, arranged as described, in combination with the biasing means precisely locates the optical source by eliminating each of six possible degrees of movement of the source.

To replace the optical source, a user merely removes the assembly containing the source, and replaces it with a new assembly having an optical source mounted therein in precise alignment with the six mounting pads. The user simply slides the new assembly into the slot of the housing and resumes operating the optical coupler. Depending upon the overall cost of the removable assembly, the user may merely discard the first assembly. In other cases, the user may return the assembly to the vendor who installs a new source onto the base of the assembly and aligns the new source precisely with the mounting pads of the base. In this manner, the old base may be reused with a new source. Again, precise alignment is ensured because the source is precisely aligned with the mounting pads and, upon insertion into the housing, the mounting pads are then precisely aligned with the optics of the optical coupler.

Accordingly, the general objects of the invention set forth above are achieved. Other objects, features and advantages of the invention will be apparent from the description which follows and from the attached drawings.

DETAILED DESCRIPTION OF EXEMPLARY EMBODIMENTS OF THE INVENTION

Referring to the figures, exemplary embodiments of the invention will now be described.

Figure 1:
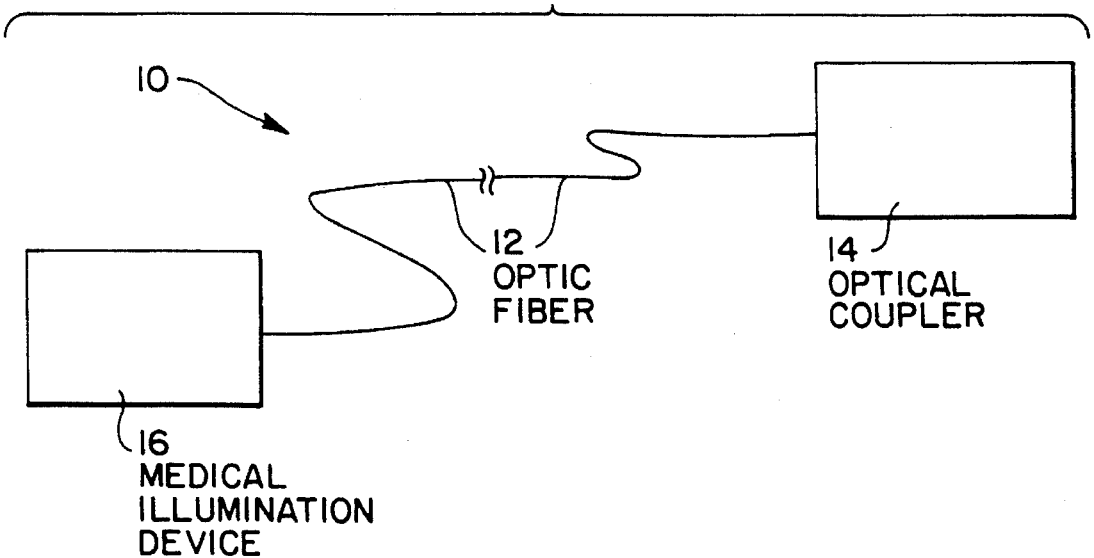
FIG. 1 is a block diagram illustrating a medical illumination system having a single optic fiber coupling light from an optical coupler system into a medical illumination device.

FIG. 1 illustrates a medical illumination system 10 having a single fiber optic 12 coupling light from an optical coupler 14 to a medical device 16. The medical device may be a surgical headlamp, luminaire, endoscope, borescope, etc. Optical coupler 14 includes internal optical components (not shown in FIG. 1) configured for reflecting light from an optical source (also not shown) into the single optic fiber for transmission to the medical illumination device. The source may be, for example, a xenon arc lamp. The optical components may include, for example, mirrors having electrical, toroidal or reflecting surfaces. Examples of suitable optical couplers are described in U.S. Pat. No. 5,430,630 and U.S. Pat. No. 4,757,431.

Figure 2:
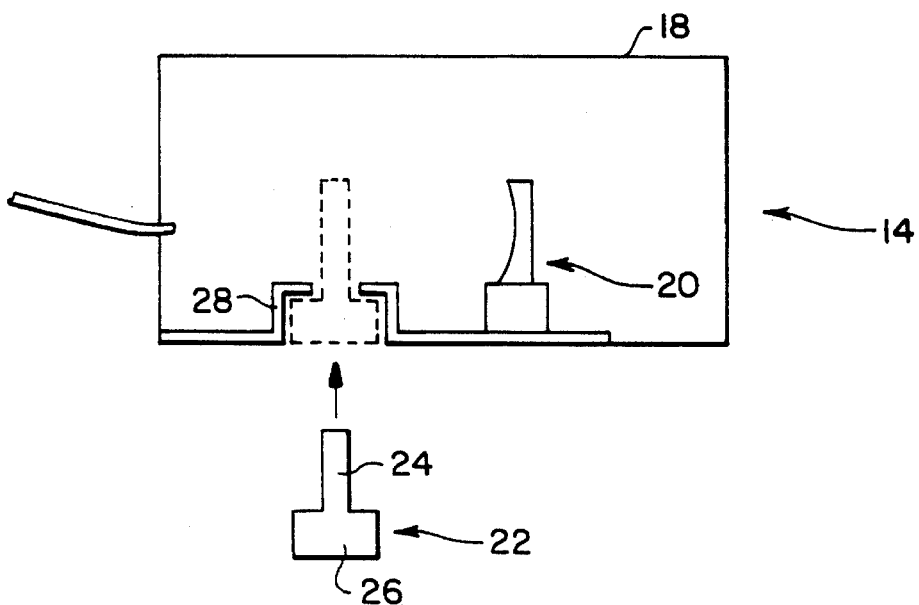
FIG. 2 illustrates a simplified view of the optical coupler of FIG. 1, particularly illustrating a removable light source assembly and a non-removable optical system assembly.

With reference to the remaining figures, internal component of the optical coupler will now be described in greater detail. FIG. 2 provides a simplified view of optical coupler 14. The optical coupler includes a housing 18 into which an optical system 20 is securely, and preferably integrally, mounted. Coupler 14 also includes a removable source assembly 22 which includes a lamp 24 mounted to a base 26. Housing 18 includes a receiving block 28 having a slot sized to receive source assembly 22. In FIG. 2, phantom lines illustrate the source assembly inserted within the slot of the receiving block. Mechanisms, described below, are provided for ensuring alignment of the source with the optical system while the removable assembly is inserted within the receiving block. Precise alignment of the source in the optical system is required to ensure that an adequate amount of light is coupled into the single optic fiber. By providing for removable source assembly, and ensuring precise alignment while the assembly is inserted, the source is thereby easily replaceable.

Figure 3:
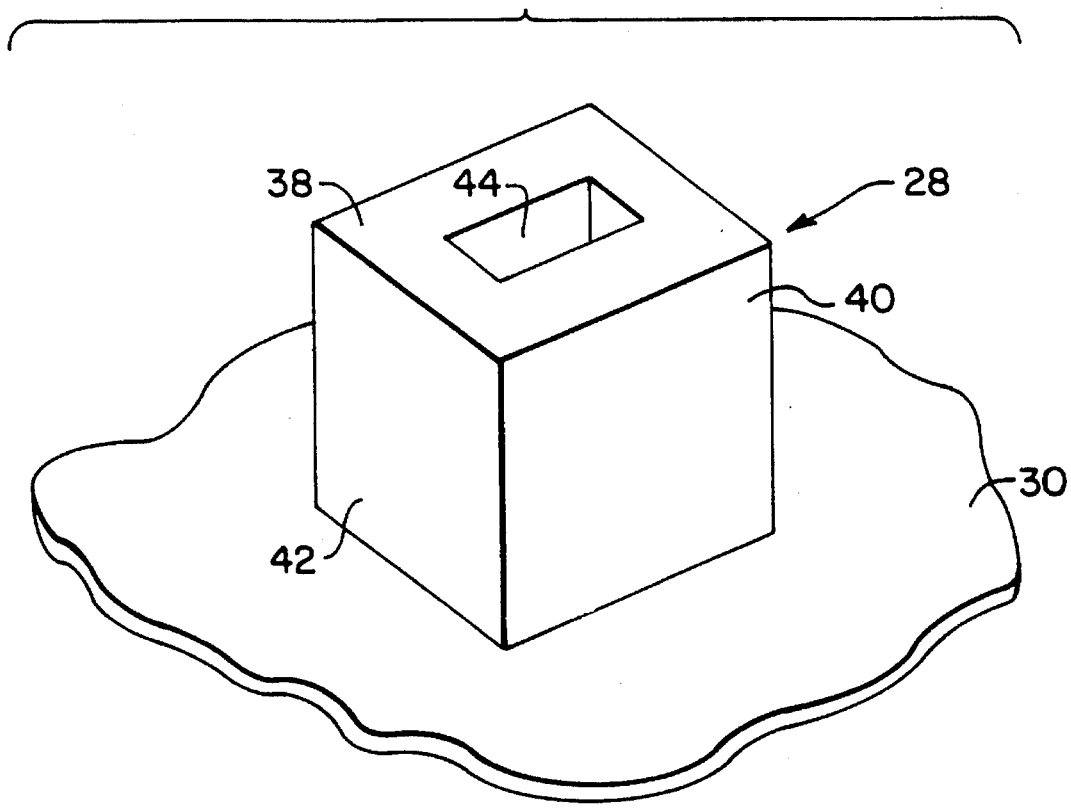
FIG. 3 is a partial perspective view of a portion of the housing of the optical coupler of FIG. 2 shown in conjunction with the removable optical source assembly of FIG. 2.
Figure 3:
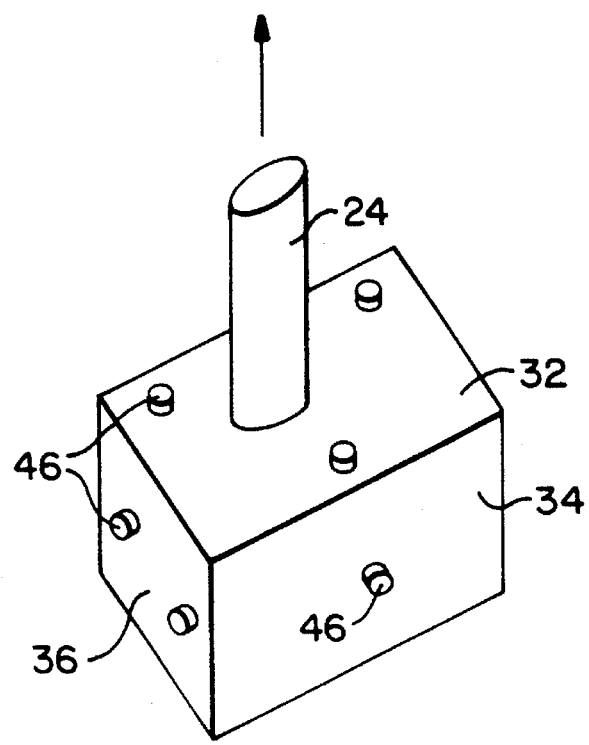

The mechanism by which precise alignment is ensured will now be described with reference to the remaining figures. In FIG. 3, removable assembly 22 is shown in perspective view along with receiving block 28 and a portion of a bottom wall 30 of the housing of the optical coupler. Base 26 of removable assembly 22 is a substantially rectangular three-dimensional block having mutually perpendicular opposing sidewalls 32, 34 and 36. Receiving block 28 likewise includes mutually perpendicular interior-facing walls 38, 40 and 42. While inserted, the sidewalls of the removable assembly are disposed adjacent to, and parallel with, corresponding interior sidewalls of the receiving block.

Receiving block 28 also includes a top opening 44 sized for receiving source 24 such that the source is positioned within the interior of the optical coupler for illuminating the optical system.

To ensure precise alignment of the optical source, a total of six mounting pads, generally denoted 46, are provided. Three of the mounting pads are formed on top sidewall 32, two on sidewall 36 and one on sidewall 34. The three mounting pads of sidewall 32 define a first plane. The two pads of sidewall 36 lie within a second plane which is perpendicular to the first plane. The single pad of sidewall 34 lies within a third plane which is perpendicular to both the first and second planes. Hence, the six mounting pads electively define three mutually perpendicular or orthogonal planes.

Upon insertion of the removable assembly into the receiving block, the three mounting pads of sidewall 32 press against interior wall 38 of the receiving block. Likewise, the two mounting pads of sidewall 36 of the removable assembly press against interior wall 42 of the receiving block. Finally, the single pad of sidewall 34 presses against interior wall 40 of the receiving block. By pressing the six mounting pads against the three mutually perpendicular interior walls of the receiving block, the base of the removable assembly is precisely located with respect to the receiving block. Furthermore, the optical source is mounted in a precise predetermined relationship with the six mounting pads of the base of the removable assembly. Hence, upon insertion, the source is also positioned precisely with respect to the receiving block.

Although not shown in FIG. 3, components of the optical system are mounted in a precise fixed relationship to the interior sidewalls of the receiving block. In this manner, the source is precisely positioned with respect to the optical components and precise alignment of the optical source with the optical system is achieved. Of course, accurate alignment of the source with the optical system is only achieved if the relative positions of the optical system and receiving block and of the source and mounting pads are predetermined and maintained. Such may be achieved by manufacturing and mounting the various components to high tolerances. Also, care should be taken to ensure that heating of the interior of the optical coupler does not significantly displace or warp any of the various components.

Six mounting pads are employed because such is the maximum and the minimum number of pads necessary to precisely position the base of the removable assembly with respect to the receiving block. If fewer mounting pads are provided on any of the sidewalls, then the base may tilt or slide while positioned within the receiving block. If more mounting pads are provided, then the location of the base is "over constrained". For example, if four mounting pads are provided along the top sidewall, the four mounting pads may not necessarily lie within a single plane and, as a consequence, the mounting pads may not be able to all lie flush against the corresponding interior wall of the receiving block. Hence, the 3:2:1 arrangement of mounting pads provides "exact constraint." Of course, the relative positioning of the six mounting pads may vary. For example, the three coplanar mounting pads need not be formed upon the top sidewall, but may be formed along one of the other sidewalls.

Figure 4:
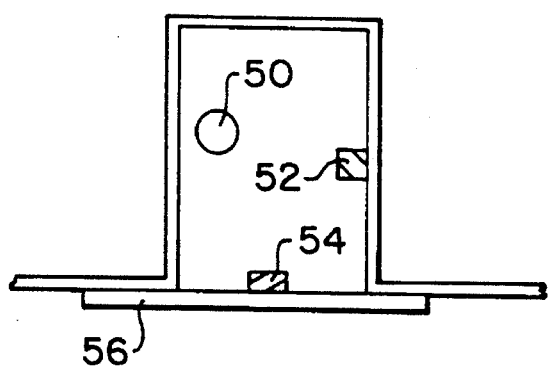
FIG. 4 is a side cross sectional view of an alternative embodiment of the receiving block of FIG. 3, incorporating three virtually perpendicular biasing mechanisms.

Thus, the six mounting pads, when placed against corresponding interior walls of the receiving block, precisely position the optical source with respect to the receiving block and thereby with respect to the optical system as well. To ensure that the mounting pads remain positioned against the corresponding interior walls, three mutually perpendicular biasing mechanisms are employed. These are illustrated in FIG. 4. More specifically, biasing mechanisms 50, 52 and 54, which each may include a spring arrangement, are positioned for applying biasing forces perpendicular to the three sidewalls of the base of the removable assembly. Biasing mechanism 50 is positioned to press the mounting pads of sidewall 36 into interior wall 42 of the receiving block. Biasing mechanism 52 is positioned to press the single mounting pad of sidewall 34 into interior wall 40 of the receiving block. Finally, biasing mechanism 54 is mounted to a slidable panel 56 (not shown in the other figures) to press the three mounting pads of top wall 32 against corresponding interior wall 38 of the receiving block. Thus, the biasing mechanisms and panel 56 together hold the removable assembly within the receiving block while also pressing the six mounting pads against the corresponding interior wall of the receiving block, thereby maintaining precise alignment of the optical source with respect to the receiving block and thereby to the optical system mounted therewith.

As noted, precise alignment of the source with the optical system is ensured. This, however, requires that the source be precisely aligned with the base of the removable assembly and that the optical system be precisely aligned with the receiving block. To this end, the optical coupler containing the receiving block and optical system is manufactured to precise tolerances to ensure that the optical components are in a precise, predetermined location with respect to the receiving block. The light source may be aligned with the pads of the removable base by, for example, first inserting the base into an optical coupler, perhaps one maintained at the facilities of a vendor. Then, the source, which may be an arc lamp, is placed on the base and adjusted for alignment with the optical system. Various sensors may be employed for detecting proper alignment. The source is then securely affixed to the base, perhaps by using high quality epoxies. Thereafter, the base, with source mounted thereon, is removed from the optical coupler and may be sold as a replacement optical source for use in any identical optical couplers, such as over previously sold to a customer. Other techniques for aligning the lamp with the pads may alternatively be employed.

In use, if the lamp or other light source within the optical coupler of the customer burns out, the customer merely obtains a replacement lamp assembly (prealigned as described above) and replaces the burned-out lamp merely by removing the previous assembly and inserting the new assembly. Alignment of the new lamp is ensured without requiring any alignment steps to be taken by the user.

The user may return the assembly having the burned-out lamp to the vendor who installs and aligns a new source onto to the returned base. In this manner, the vendor can recycle or reuse the assembly base merely by installing and aligning a new lamp. It should be noted that the vendor may choose to replace the source with a different source, perhaps having a different size and shape. Nevertheless, within a reasonable range of sizes, a new lamp or other source can be mounted and aligned with the base (using the steps described above) such that the new source may be used in connection with the optical couplers. The user need not even know that a new and entirely different light source is employed.

As noted above, the overall cost associated with removing and replacing the removable assembly of the invention is relatively small compared to the cost associated with removing and replacing the light source and optical system assembly of the prior art. Indeed, the cost of the removable assembly of the invention may be sufficiently low that a user, such as a doctor having a private practice, may simply wish to purchase several replacement assemblies at once. Then, if one lamp burns out, the doctor merely replaces the lamp (with its removable assembly) with another one and immediately resumes using the medical illumination device, with little or no down time.

One of the reasons that the costs of the replaceable assembly may be kept low is that the base of the assembly need not be manufactured to precise tolerances. Rather, the base of the assembly may be molded or die-cast in accordance with conventional techniques to relatively low tolerances. The base need not be manufactured to a high tolerance, because the source is aligned to the mounting pads of the base. In other words, any variance in the shape of the base is compensated for when the source is aligned with the mounting pads of the base.

Figure 5:
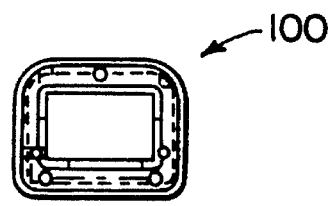
FIGS. 5–7 illustrate top, side and rear views, respectively of one exemplary embodiment of a base of the light source assembly of FIGS. 2–3.
Figure 6:
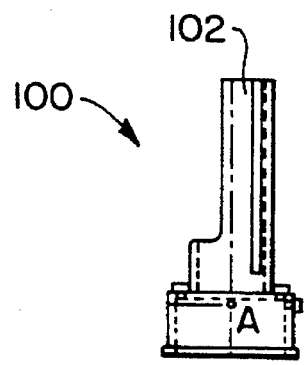
Figure 7:
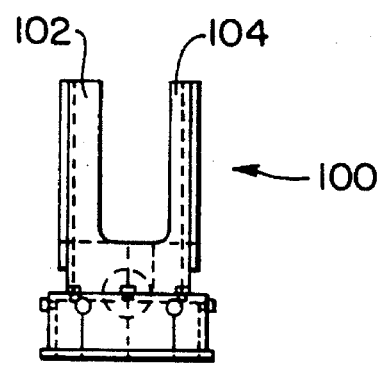

FIGS. 5, 6 and 7 illustrate an alternative exemplary base 100 for use within a removable source assembly. Base 100 includes upwardly extending members 102 and 104 which protect an arc lamp (not shown) mounted therebetween. The upwardly extending supports also help prevent a user from accidentally touching the arc lamp which may be hot. A wide variety of other shapes for the base may alternatively be employed.

What has been described is a removable optical source assembly for use in an optical coupler. Although described with respect to illustrated embodiments, principles of the invention may be applied to other systems and applications as well.

I claim:

1. In a system for coupling light from a source through an optical system and into an output fiber optic element, wherein the source and the optical system are mounted within a housing and wherein, for proper operation, the source must be disposed in precise alignment with the optical system, the improvement comprising:

mounting the source to a removable assembly for slidable insertion into and removal from the housing, with said assembly including elements for maintaining precise alignment of the source with the optical system while the source and assembly are positioned within the housing;

wherein the elements for maintaining precise alignment include a plurality of mounting pads, with at least one first mounting pad aligned along a first plane, at least one second mounting pad aligned along a second plane not parallel to the first plane, and at least one third mounting pad aligned along a third plane not parallel to either the first or second planes.

2. The improvement of claim 1, wherein the elements for maintaining precise alignment include three said first mounting pads aligned along said first plane, two said second mounting pads aligned along said second plane perpendicular to the first plane, and one said third mounting pad aligned along said third plane perpendicular to both first and second planes, and wherein said mounting pads are in a fixed relationship with said source.

3. The improvement of claim 2, wherein said mounting assembly includes a solid rectangular base and wherein said mounting pads are mounted on mutually perpendicular sidewalls of said base.

4. The improvement of claim 2, further including means for biasing said mounting pads against interior sidewalls of a slot formed within said housing.

5. A mounting assembly for mounting a light source within a housing containing an optical system for coupling light from the source to an output optical fiber element, said mounting assembly comprising:

a base;

means for receiving and holding the optical source in a fixed relationship with said base;

three mounting pads mounted along a first sidewall of said base;

two mounting pads mounted to a second sidewall of said base, said second sidewall being perpendicular with said first sidewall; and a single mounting pad mounted to a third sidewall of said base, said third sidewall being mutually perpendicular to both said first and second sidewalls.

6. The mounting assembly of claim 5 wherein the mounting pads are integrally formed with said base.

7. An optical coupling system for coupling light into an optical fiber element, said system comprising:

a housing;

an optical system mounted within the said housing;

means for holding an entrance aperture of the fiber optical element within said housing;

a light source; and means for removably positioning said light source within said housing in alignment with said optical system for coupling light from the light source to the optical system into the entrance aperture of the fiber optic element;

wherein the means for removably mounting the optical source within the housing includes a base for holding the optical source;

three mounting pads mounted along a first sidewall of said base;

a pair of mounting pads mounted along a second sidewall of said base; and a single mounting pad mounted along a third sidewall of said base, with said first, second and third sidewalls being mutually perpendicular to one another.

8. The system of claim 7 wherein said housing includes a slot for receiving said base, said slot having three interior walls mutually perpendicular to one another; and wherein said system further includes means for biasing said mounting pads against said interior walls of said slot of said housing.

9. The system of claim 7, wherein the optical source is an arc lamp.

10. The system of claim 7 further including a fiber optic element coupled into the fiber optic receiving aperture for coupling light into a medical illumination device.

* * * * *